Patented Feb. 9, 1932

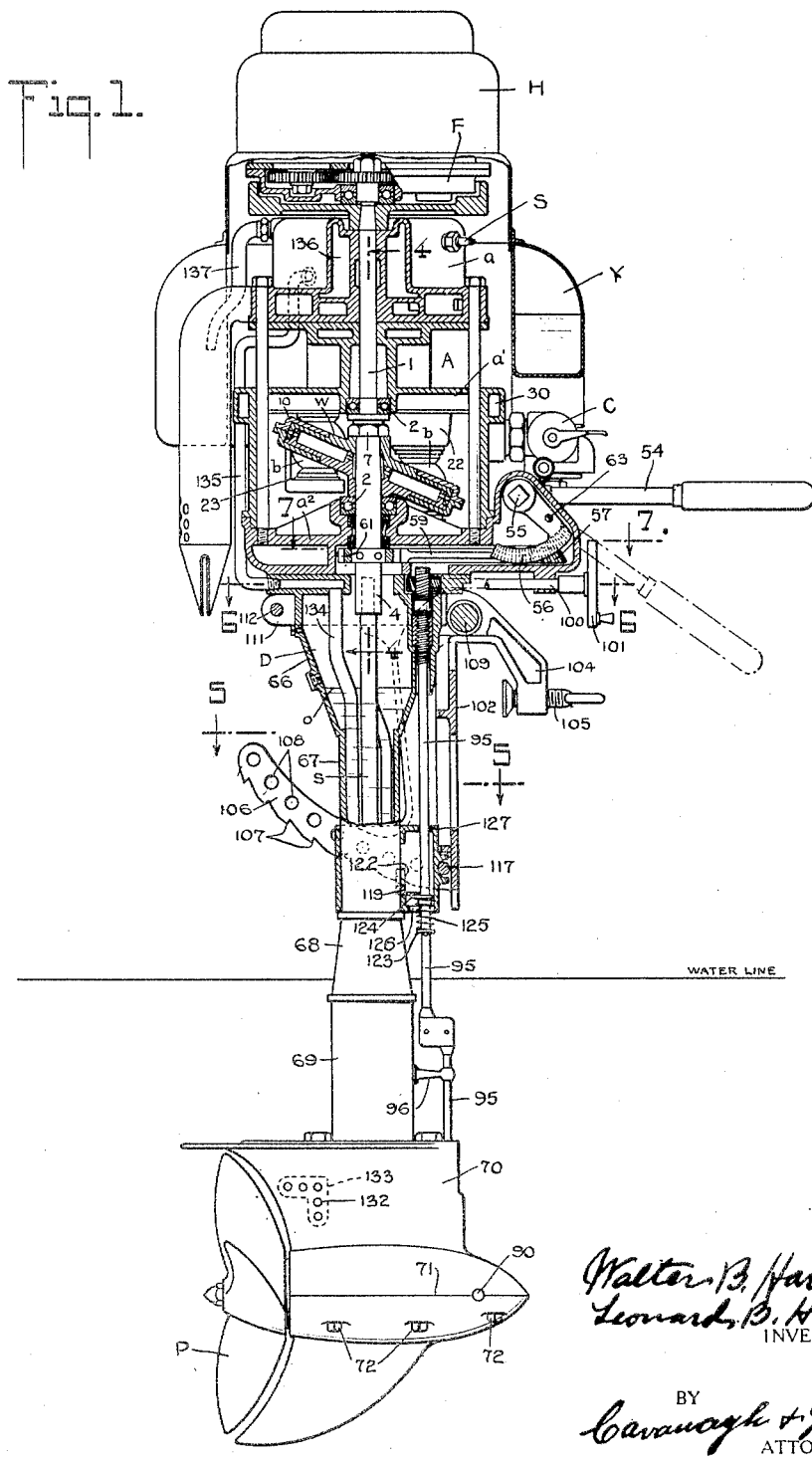

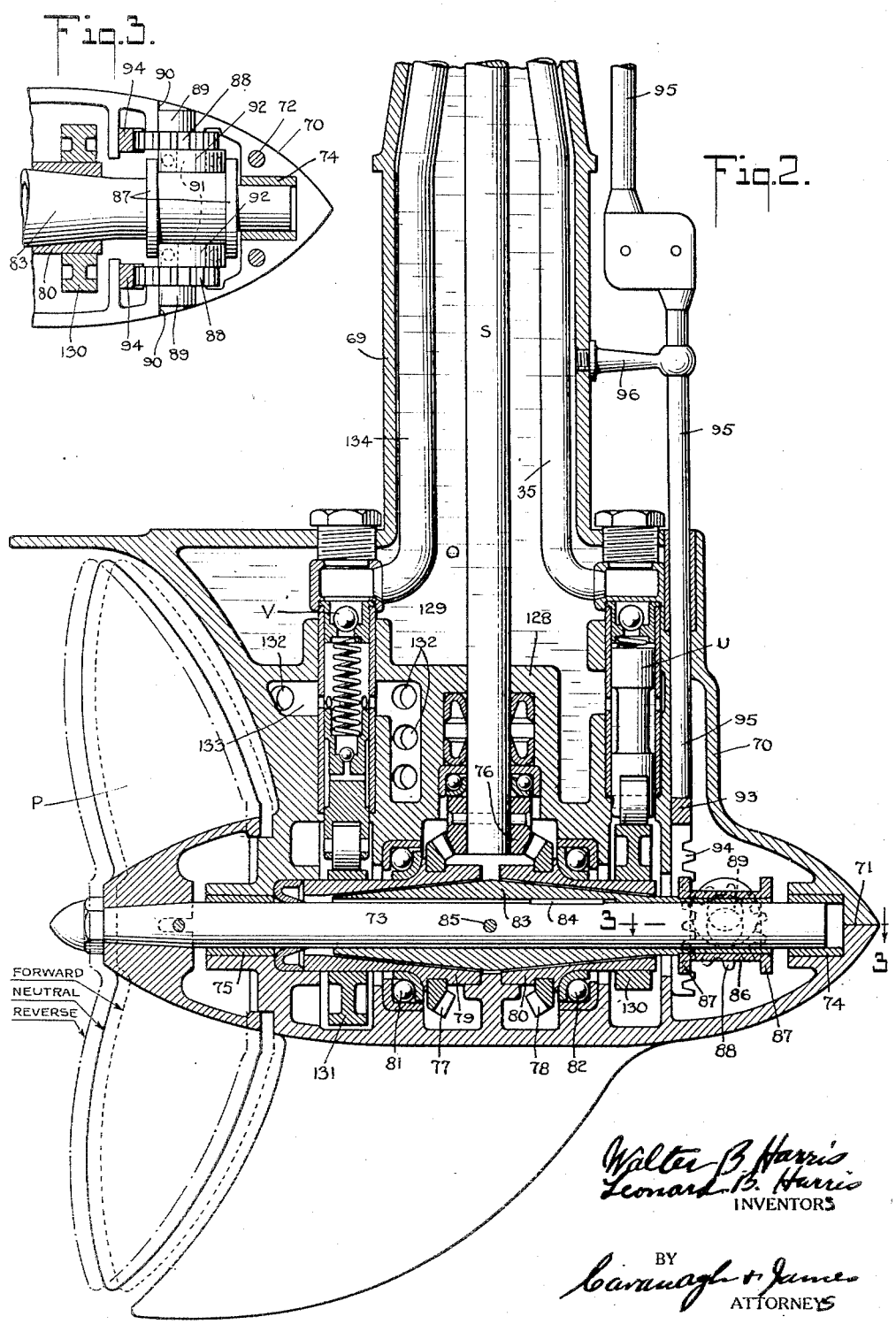

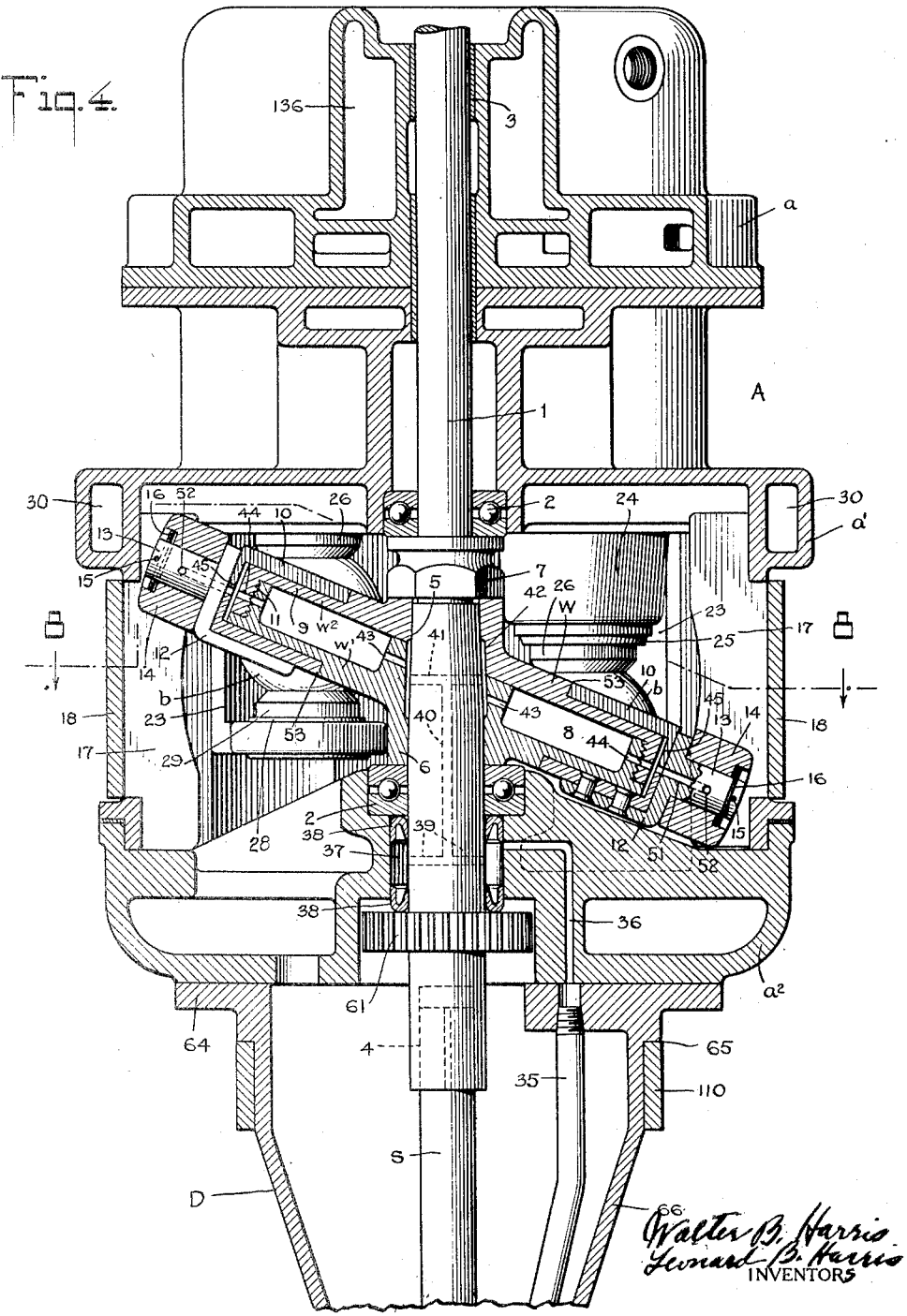

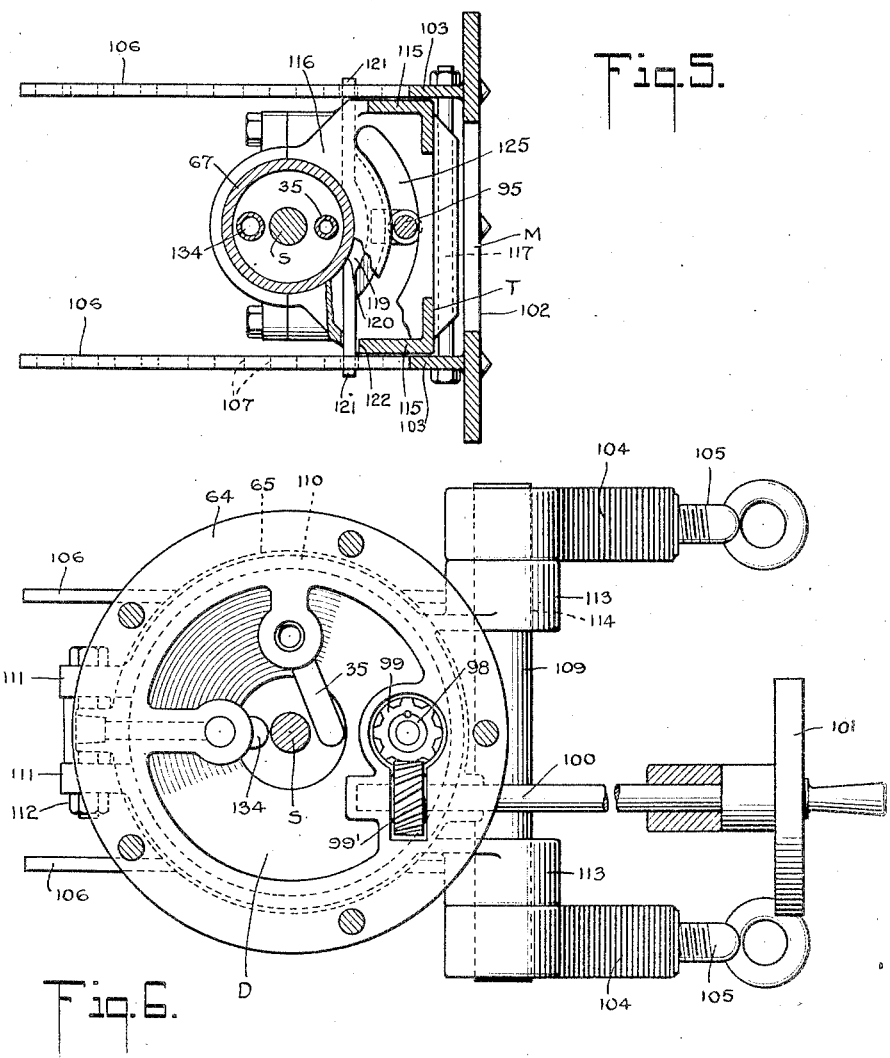

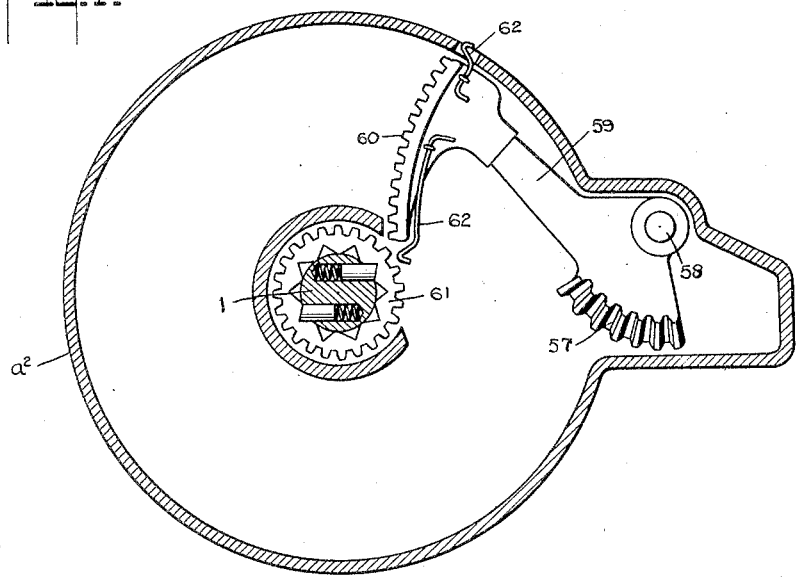
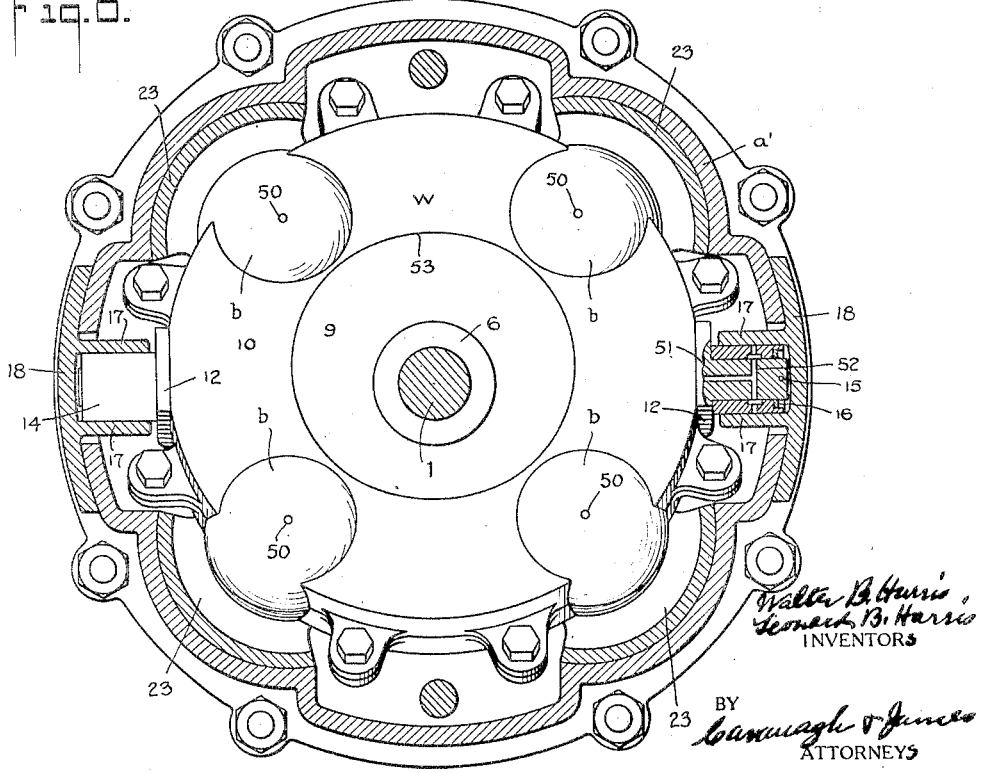

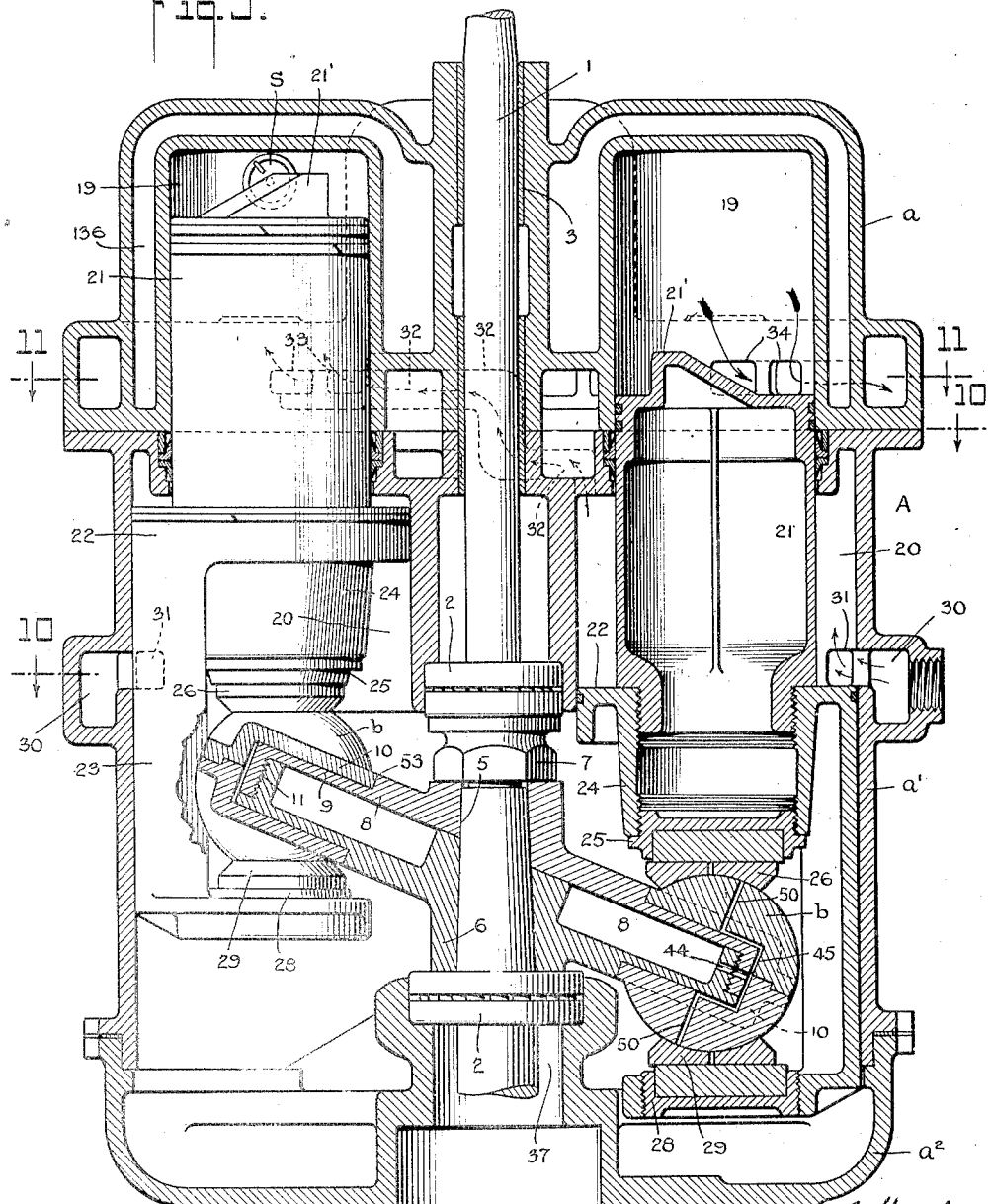

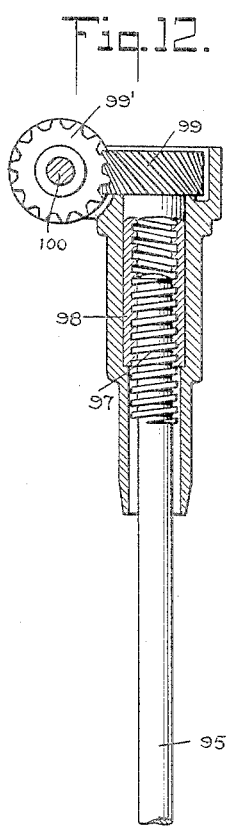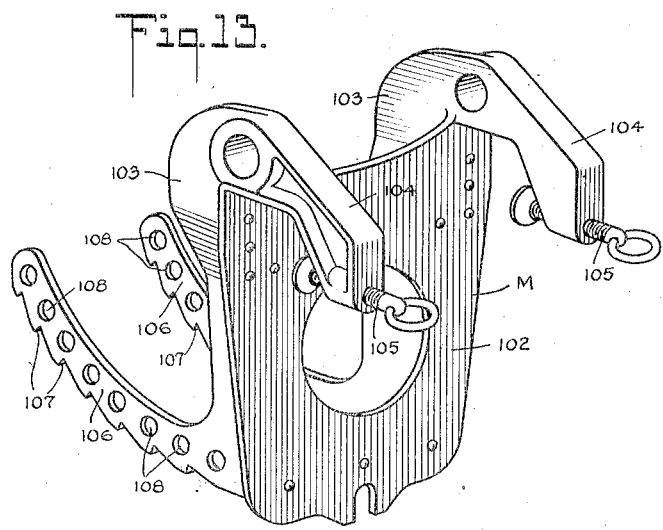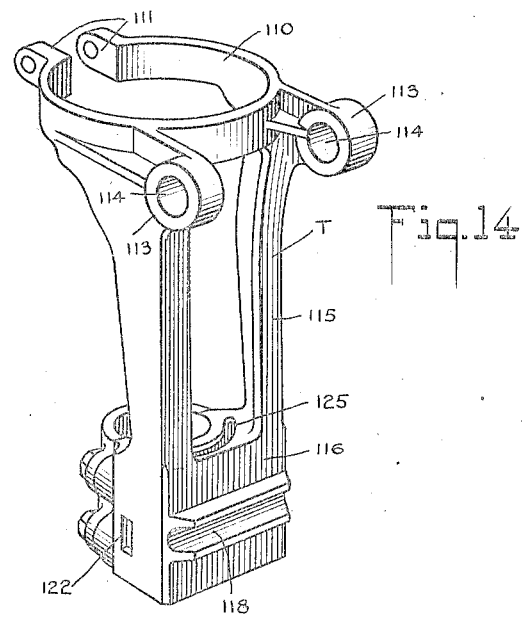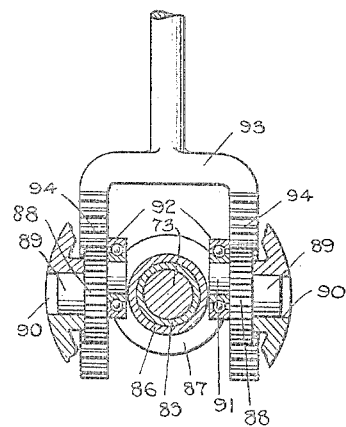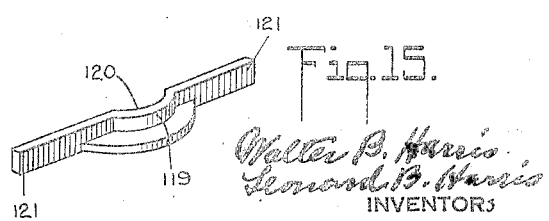

1,844,386

UNITED STATES PATENT OFFICE

WALTER B. HARRIS AND LEONARD B. HARRIS, OF NEW YORK, N. Y., ASSIGNORS TO WOBBLE ENGINE CO., INC., OF NEW YORK, N. Y., A CORPORATION OF NEW YORK

POWER UNIT

Application filed July 20, 1928. Serial No. 294,161.

This invention relates to power units, and while we have in the present instance shown the same as embodied in an outboard power unit or motor for marine use, it is to be understood that it is not limited in its useful application to this particular purpose. For instance, it may be embodied in the form of an inboard motor, and is also adapted for use in connection with the operation of various movable or transporting machines, such as airplanes, automobiles, and the like, and may also be advantageously employed in connection with the operation of stationary machinery.

Predicating the present description, therefore, upon the particular embodiment of the invention herein described by way of example or illustration, it is our purpose to provide a motor unit operable to propel a boat, either ahead or astern, without requiring reversal of the engine, and further operable to run idle or without transmitting motion to the propeller, if and when desired.

A further object of the invention is to provide for the cooling of the lubricant, such as oil, used in lubricating the hydrocarbon engine part of the power unit, and this, in the case of the outboard motor, is accomplished by so locating the reservoir for the lubricant that it will be positioned below the waterline, and therefore will be kept cool by the surrounding water.

Another object of the invention is the provision of a novel form of mechanically operated lubricant-circulating system for forcing the lubricant from its reservoir to the engine bearings of the power unit and permitting the return of the lubricant from such engine bearings to the reservoir.

A further object of the invention, particularly applicable to a marine power unit, is the provision of an engine cranking device which also functions as a tiller.

A further object of the invention is the provision, in the case of an outboard motor, of a novel means operating automatically in conjunction with a reversing mechanism to prevent rearward swinging of the propeller away from the stern of the boat when the reversing mechanism is adjusted to propel the boat astern.

Another object of the invention is the provision, in a power unit, of a two-cycle multicylinder hydrocarbon engine of the crankless type having a series of working cylinders and pistons, together with a series of step cylinders and pistons, arranged or grouped around the engine shaft in the same plane, with communicating ports so located and arranged that intercommunication is effected between opposite (as contradistinguished from adjacent) working and step cylinders of the series, so that the combustible mixture is initially drawn or sucked into a step cylinder and subsequently forced into the oppositely disposed working cylinder, and vice versa. By this arrangement we not only provide a compact, efficient arrangement, but in a two-cycle engine, we eliminate all crankcase compression, and are thus enabled to avail ourselves of the advantages of a crankless engine wherein the shaft receives its motion through a wobble plate driven by the pistons.

Furthermore, with such an arrangement the liability of the lubricating oil being diluted by the combustion mixture or the components thereof, is avoided.

A further object of the invention is the provision of an outboard motor wherein a mutation or wobble plate mechanism is substituted for the usual crank shaft as a means for converting reciprocating motion on the part of the engine pistons into rotary motion which is transmitted to a drive shaft.

A further object of the invention is the provision in an outboard motor of an external casing for the working parts arranged therein; the casing sections and working parts being so constructed as to afford ready access to any desired part or parts for the purposes of inspection, removal or adjustment upon detachment of the casing section or sections which cover the said part or parts.

With the above recited objects and others of a similar nature in view, our invention consists in the construction, combination and arrangement of parts set forth in and falling within the scope of the appended claims.

In the accompanying drawings wherein we have shown our invention by way of exemplification, as embodied in an outboard motor unit, Fig. 1 is a view partly in vertical section and partly in elevation of an outboard motor unit embodying our invention;

Fig. 2 is an enlarged vertical view partly in section and partly in elevation, showing the propeller and certain associated parts, and illustrating the propeller reversing mechanism and the lubricating and cooling devices;

Fig. 3 is a horizontal sectional view taken on line 3—3 of Fig. 2 looking in the direction of the arrows, and showing the mechanism for longitudinally shifting the propeller shaft to reverse, idle or go ahead;

Fig. 4 is a vertical sectional view taken through the two-cycle wobble plate engine employed in connection with the unit;

Fig. 5 is a horizontal sectional view taken on line 5—5 of Fig. 1;

Fig. 6 is a similar view taken on line 6—6 of Fig. 1, looking in the direction of the arrows;

Fig. 7 is a horizontal cross-sectional view taken on line 7—7 of Fig. 1;

Fig. 8 is a horizontal sectional view taken on line 8—8 of Fig. 4, looking in the direction of the arrows;

Fig. 9 is a vertical sectional view taken through the two-cycle engine of the unit;

Fig. 12 is a detail view partly in section of a portion of the yoke stem arrangement for operating the propeller clutch;

Fig. 13 is a detail perspective view of the stern bracket for mounting or clamping the outboard motor to the stern of the boat;

Fig. 14 is a perspective view of the tilting bracket in which the outboard motor is hung and revolved;

Fig. 15 is a detail perspective view of the locking arrangement of the tilting mechanism which is located at the foot block of the swinging bracket of such tilting mechanism.

Figure 10:
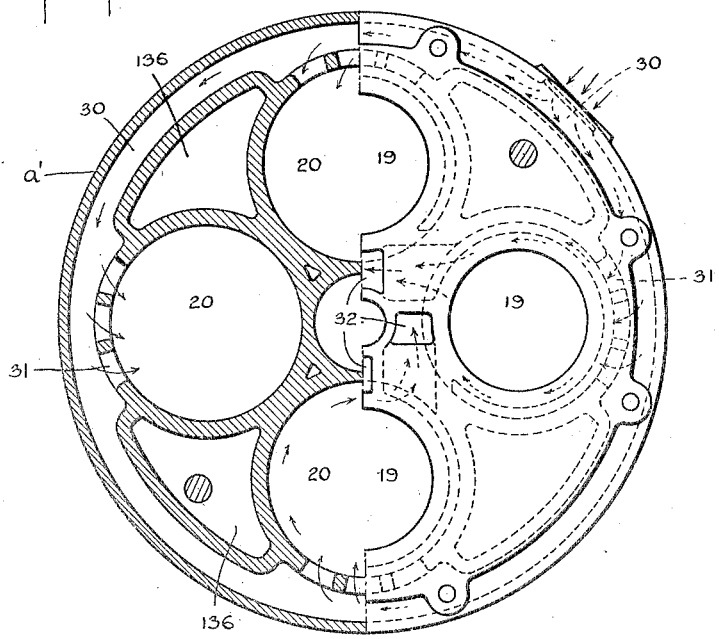
Fig. 10 is a cross-sectional view taken on line 10—10 of Fig. 9, looking in the direction of the arrows.
Figure 11:
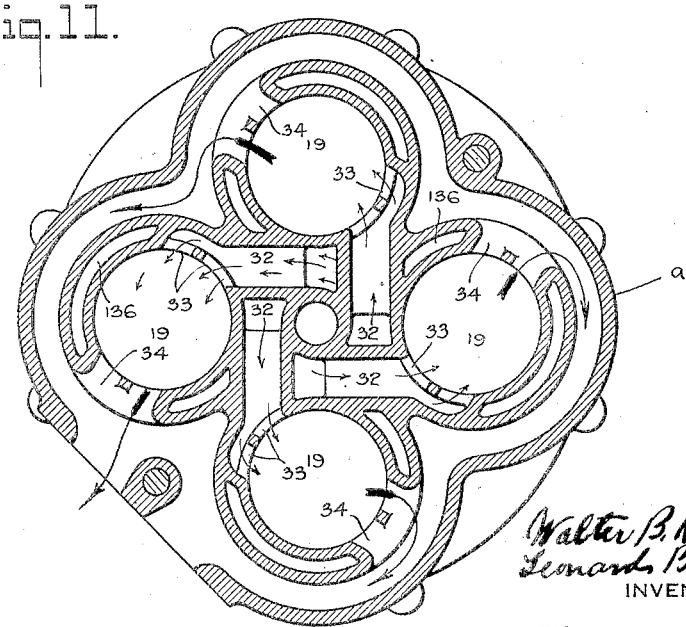
Fig. 11 is a similar view taken on line 11—11 of Fig. 9.

The assemblage embodies—
1. A novel construction of engine.
2. A novel system of engine lubrication.
3. A novel starting mechanism for the engine usable as a steering device.
4. A novel driving, idling and reversing mechanism for the driven device, i. e., a propeller.
5. A non-tilting mechanism locking on the reverse.

*The engine*

The present engine is in the nature of a two-cycle multi-cylinder hydrocarbon engine of the crankless type, in that it has a straight shaft receiving rotary motion through a wobble plate driven by reciprocating pistons. The engine embraces also a series of working cylinders and pistons together with a series of step cylinders and pistons arranged or grouped about the engine shaft in the same plane therewith, as distinguished from the usual radial arrangement, the engine having communicating ports so located and arranged that intercommunication is effected between opposite (as distinguished from the adjacent) working and step cylinders of the series, so that the combustible mixture is initially drawn or sucked into a step cylinder and subsequently forced into the oppositely disposed working cylinder, and vice versa. By this construction there is provided not only a compact, efficient arrangement, but in a two-cycle engine all crankcase compression is eliminated and all the advantages of the crankless engine ar available, including the avoidance of dilution of the lubricating oil by the combustible mixture.

*A description of the engine*

Referring now to the drawings in detail and particularly to Figs. 1, 4 and 9, A indicates a metallic liquid-tight engine casing made up, in the present instance, of three sections, the upper section $a$, the middle section $a'$, and the lower section $a^2$. These sections are preferably formed of castings arranged end to end and detachably connected so that when need be ready access may be had to the interior of the casing. The numeral 1 designates the engine shaft which is mounted in anti-friction or ball bearings 2—2 housed in the middle section of the casing, the upper end of the shaft resting in the sleeve bearing 3, while the lower end of the shaft is extended through the bottom section of the casing and socketed as at 4 to receive the end of a driven shaft $s$ through which the power is to be transmitted. The central section of the power shaft 1 is enlarged and tapered as at 5, and on this section of the shaft is mounted the hollow wobble plate indicated as an entirety by the letter W, one end of the hub 6 of the wobble plate abutting against the side of the adjacent roller bearing 2, while at the opposite end of the hub is the lock nut 7 for holding the wobble plate in proper position As will be noted by reference to Fig. 4, the wobble plate is hollow or formed with a chamber 8, the periphery of the wobble plate being shouldered or stepped as at 9 to receive and fit the two-part casing ring 10. It will be noted that the wobble plate itself is, in the present instance, made of two circular flanged parts or disks W' and W² threaded together as at 11. Bolted to the ring casing 10 at diametrically opposite points thereof are the two angular brackets 12 carrying the trunnion pins 13 which extend radially with respect to the wobble plate. On each of these trunnion pins is loosely seated a trunnion block 14 held against endwise displacement by means of cross pin 15 and the washer 16. Each block 14 slides between and is guided by the spaced parallel side walls 17 projecting inward of the casing from the curved plate 18, as shown in Figs. 4 and 8. By this arrangement it will be noted that as the wobble plate revolves from right to left or from one angle to another with respect to the shaft 1 the blocks 14 will slide in an arc between their guide plates, and, at the same time, the trunnions loosely fitting the bores of such blocks will prevent the turning or displacement of the ring casing and consequently hold the same in proper position for piston operation, as hereinafter described.

The engine, which is of the two-cycle type, is provided with an even number of pistons and cylinders—that is, four, as working cylinders 19, located adjacent the top of the engine, and four step cylinders 20, arranged below and in alignment with the working cylinders. Within each of the working cylinders there reciprocates a working piston 21 and within each of the step cylinders there reciprocates a step piston 22—each working piston being connected, as by threads, with the aligning or corresponding step piston. Each step piston 22 is formed with a yoke 23, the upper portion of each yoke having a cylindrical extension 24, into which is threaded an adjustable nut 25. This nut 25 has seated therein the shouldered socket 26, the concave face 27 of which forms a bearing for the adjacent ball $b$ of the piston ring casing. It will be observed that there are four of these balls formed with or mounted on the ring casing in any desired way. Likewise, at the opposite or lower end of each yoke there is threaded a nut 28 also carrying a socket 29 with its concave face bearing against the opposite side of ball $b$. The nuts 25 and 28 can of course be adjusted to increase or decrease the bearing against the confined ball $b$, as for example, in taking up wear or for other purposes, while the ball is free to turn in the manner of a ball and socket against the concave face of the confining sockets.

It will be noted that upon the ring casing of the wobble plate there are four of these balls $b$, each ball being formed of two semispherical sections bolted or otherwise suitably secured together.

When the engine is in operation, as hereinafter described, the reciprocation of the pistons will, through the ball and socket connections with the ring plate, impart a rotary wobbling motion to the wobble plate and a rotary motion to the engine shaft.

*Fuel supplied for the engine.*—The fuel, in the present instance, the usual combustible mixture of gasoline and air, is mixed in any suitable form of carburetor C (Fig. 1). Now referring to Fig. 9 for example, it will be noted that the step piston and its companion working piston at the right-hand side of Fig. 9 are in their lowermost positions. The movement of such step piston to its lowermost position creates a vacuum in the step cylinder 20, and as the step piston moves below the passage 30 leading from the carburetor, it opens the port 31 forming communication between the carburetor passage 30 and the engine cylinder, and thereupon the fuel or gas will pass into the step cylinder 20. As the step piston 22, now in its lowermost position, starts on the upstroke it compresses the fuel in the step cylinder 20 and forces the latter through the channel 32 and inlet port 33, into the oppositely disposed working cylinder shown at the left-hand side of Fig. 9. At this time, of course, the working piston 21 in such oppositely disposed working cylinder has moved downwardly a sufficient distance to uncover these ports 33, and the inrushing combustion charge striking the deflector 21' of the working piston 21 is deflected upward into the firing head of the cylinder. On the return or upward stroke of the working piston this freshly admitted charge is compressed and fired in the usual manner, as by an ignition device indicated at S, or by heat of compression. This will, of course, again drive the working piston downward the length of its stroke, and just before reaching the inlet port 33, the exhaust ports 34 in the working cylinder are uncovered and the exploded charge is exhausted through these ports, and immediately thereafter the new incoming charge passes into the working cylinder.

We have just described the cycle of operation as it affects one step piston and its oppositely disposed working piston—in other words, it will be apparent from this description that the charge is drawn in to the one step cylinder by suction created in the downward movement of such step piston, and then upon the upward movement of the piston the charge in the step cylinder is forced through the channels and ports into the oppositely disposed working cylinder, and there exploded as described, and that subsequently the exploded charge is exhausted from the working cylinder and the new charge admitted.

It will further be understood that the gas passage 30 connected with the carburetor is in the nature of a common manifold or circular channel (see Fig. 10) through which the incoming gas or fuel from the carburetor passes to the ports leading into the various step cylinders, in the present instance, four in number, and that the pistons are so set and synchronized that they will fire in sequence, as will be readily understood.

It will further be noted that as the charges are successively fired in the working cylinders, a reciprocating motion will, of course, be imparted to the pistons. As the pistons are arranged in oppositely disposed pairs, in working engagement with the casing ring of the wobble plate through the piston yokes and ball and socket connections, the movement of the pistons in one direction will cause a pressure to be exerted on the ring casing of the wobble plate, the latter being on an incline or angle to its circular path. This pressure being exerted on this circular wedge or angle will cause the wobble plate to slide around within the ring casing in a direction corresponding to the sequence of the pressure being exerted on the pistons and thereby impart a rotary motion to the shaft, as is well understood in this type of engine.

In the present instance, the upper end of the engine shaft 1 is provided with a suitable fly wheel F, and may be used in connection with the driving of any suitable magneto.

The lubrication of the engine

In order to properly lubricate all of the working parts of the engine, we have found it advantageous to accomplish this as follows:

We prefer to employ a force feed arrangement of lubrication, wherein the oil or other suitable lubricant, under pressure, as hereinafter described for example, is delivered through the pipe 35 to channel 36 bored in the lower section of the engine casing, this channel leading into a chamber 37 made oil-tight by U-shaped packing rings 38 of leather or other suitable material. From the chamber 37 the oil passes through transverse ducts 39 bored in the shaft 1, into the longitudinal oil channel 40 extending centrally of the shaft for a short distance. This oil channel 40 discharges into transverse oil ducts 41, and the oil passing through such ducts flows into the chamber 42 in the hub of the wobble plate. From this chamber, the oil passes through radial ducts 43 into the interior of the hollow wobble plate, and thence through oil ports 44 in the periphery of the wobble plate to the annular space 45 between the rim of the wobble plate and the ring casing. From this annular space 45 the oil, being under pressure, passes down, or centripetal, between the side walls of the ring casing and shouldered section of the wobble plate, and a part of the oil will flow out through the lateral ducts 50 formed in the balls $b$ to lubricate the ball and socket connections with the pistons, and some of the oil will pass out through ducts 51 and 52 of the trunnions 13 to lubricate the trunnion block and contacting or associated parts. Any surplus oil in the space between the wobble plate and its casing ring will pass out at the shouldered joint 53 between such wobble plate and the casing ring. The oil after lubricating the parts, passes down through the engine casing to the oil reservoir or other source of supply, where it is cooled, because the oil reservoir is located below the water line, as hereinafter described.

It will be noted that by lubricating, under pressure, the parts in the manner shown, the lubricant can be conveyed immediately to the working parts and insure not only the elimination of frictional heat, but the continuous cooling and oiling of the wobble plate and the other parts. Indeed, it will be noted that the wobble plate itself practically revolves in a film or bath of oil contained between the ring casing and the adjacent part of the wobble plate.

At the same time it will be observed that the wobble plate itself acts as a reservoir for the reception, and distribution of the oil, under pressure, to all of the working parts of the engine, and that after the oil has performed its function, any surplus will drain back into the supply tank, where it may be cooled.

The engine starting mechanism

For the purpose of cranking or starting the engine, any suitable means may be employed. However, in an engine used as herein shown, for an outboard motor, we prefer to use a starting mechanism best illustrated in Figs. 1 and 7. This mechanism comprises a suitable arm or handle 54 pinned or otherwise connected at one end with the square rock shaft 55. This rock shaft has also connected therewith a segmental rack arm 56, the rack portion of which meshes with the teeth of the quadrant 57 carried by the vertically disposed pivot pin 58. The arm 59 of the quadrant 57 carries a toothed sector 60 which meshes with the ratchet pinion 61 on the engine shaft 1, the oppositely disposed spring-tensioned pawls of the pinion ratchet being so arranged as to permit the movement of the pinion in one direction, but to prevent its movement in the opposite direction. To insure the proper meshing of the toothed sector 60 with the ratchet pinion 61, spring pressed fingers or leaders 62, are attached to the arm 59, and these will act to insure that the teeth of sector 60 will always be brought into mesh with the teeth of the pinion 61 irrespective of the position in which the engine might stop.

In starting the engine, it is of course obvious that it is only necessary to actuate the handle 54 in a vertical plane a sufficient number of times to transmit motion through the train of gearing just described to turn the shaft until the engine can pick up under its own power. As soon as the engine is started under its own power, the handle lever 54 is pulled up into the horizontal position shown in full lines in Fig. 1, and a locking pin 63, suspended from the casing by chain or the like is passed through the arm 56 to lock the rack sector 60 out of mesh with the ratchet pinion 61; in other words, to entirely disconnect the cranking mechanism from the engine shaft and to retain the lever in a horizontal position so that it may be employed as tiller. Where the engine is used in an outboard motor, this handle lever 54 can be used as a tiller and steering device, as will be hereinafter described.

The propelling mechanism

The propelling mechanism, as shown herein, is one particularly adapted for outboard motors and is shown in Figs. 1 to 6 inclusive. Bolted to the lower or base section of the engine casing, as best shown in Fig. 4, is a second casing indicated as an entirety by the letter D and embodying a circular top plate 64 secured to the engine casing, a shouldered section 65, a conical section 66 depending therefrom and terminating in a tubular section 67, the latter at its lower end merging into a flared section 68, which in turn surmounts the lower tubular section 69. This lower section 69 is preferably cast integral with the casing 70 which houses the propeller shaft and its associated mechanisms. The casing 70 is preferably formed in two sections bolted at the contacting faces 71 by bolts 72.

Connected with the engine shaft at its upper end, and extending down through the casing D into the propeller casing is the drive shaft $s$. The propeller shaft is shown at 73 and at its outer end has connected therewith in the usual manner any approved form of propeller shown at P. As contradistinguished from the usual propeller arrangement, however, the shaft 73 thereof is movable or shiftable endwise or longitudinally, as hereinafter described, for the purpose of reversing and idling. And, as will be noted by reference to Fig. 2, the propeller shaft 73 is loosely mounted for this purpose in suitable bearings 74 and 75.

The propeller shaft is preferably driven as follows: At the lower end of the drive shaft $s$, connected as aforesaid with the engine shaft, is a bevel pinion 76 meshing with the differential or oppositely rotating gears 77 and 78 mounted on the cone sleeves 79 and 80 respectively, these sleeves revolving in suitable anti-friction bearings 81 and 82. The bores of the cone sleeves are of course flared or tapered with their widest sections at their confronting ends, approximately in the center of the propeller shaft and at the center line of the drive shaft. A double cone clutch member 83 is keyed to the propeller shaft at 84 so as to turn therewith, and this cone clutch is also pinned as at 85 to the shaft to prevent endwise movement of the cone on the shaft. Thus it will be noted that when the cone clutch 83 is in frictional or driven engagement with one cone sleeve or the other, motion will be transmitted from the engine shaft through the drive shaft and the cone clutch arrangement to the propeller shaft to drive the latter in the desired direction, while, as we will now proceed to describe, when the double cone clutch member 83 is out of frictional engagement with both the sleeves, the propeller shaft will be out of driven engagement or neutral, and consequently idle.

The reversing and idling mechanism

Assuming that the forward or normal driving position of the propeller is when the cone sleeve 80 is in frictional engagement with the adjacent section of the double cone clutch 83, if it be desired, for any reason to reverse the direction or drive of the propeller, this can be instantly and positively accomplished by a bodily shifting of the propeller and its shaft through the following arrangement.

Secured at one end of the cone member 83 is a flanged collar 86 having end flanges 87, as will best be understood by reference to Figs. 2 and 3. Arranged at opposite sides of the collar are pinions 88, the concentric studs 89 of which are seated in bearings 90 in the adjacent wall sections of the propeller casing. Each of these pinions 88 has extended from its inner face an eccentrically disposed stud 91, each carrying a roller 92, the eccentric studs with their rollers forming roller cams adapted at times to be brought into contact with the flanges 87 of the collar 86 to shift such collar, and consequently the double cone clutch member 83, with the propeller shaft and the propeller longitudinally, as will be readily understood. In order to operate this cam device for shifting the propeller shaft, we provide a vertically movable yoke 93 having the rack arms 94 engaging with the adjacent pinions 88. The stem 95 of this rack yoke extends up through the propeller casing, and through a supporting bracket 96, and at its upper end is threaded as at 97 into the nut 98 carrying a pinion 99 which in turn meshes with pinion 99' on the inner end of the shaft 100. It will be noted that this pinion 99' and the end of the shaft 100 are seated or housed in a recess formed in the top plate 64 of the casing D, the shaft 100 extending through the plate and at its outer end is operated or turned by a suitable actuator, such as a hand wheel, a lever, or the like, shown at 101.

From the description thus far given of the mechanism for placing the propeller in reversing and idling position, its operation will be readily understood. If the boat be travelling ahead, and it is desired to reverse, it is only necessary to actuate the lever or hand wheel 101 to transmit motion to the shaft 100, the pinion gearing, and thus through the vertical movement of the rack yoke, accomplished by the rotation of the threaded nut 98, to the pinions of the roller cam, to operate the latter and cause the cam rollers to bear against the desired flange of the collar and thus shift the cone clutch 85 and consequently the propeller shaft into reverse position, the cone clutch 83 at this time being in contact with the outer cone sleeve. However, if it is desired to shift to idling position, it is only necessary to operate the lever or wheel 101 so that the cam rollers will occupy a neutral position with respect to the flanges of the collar 86, and in which position the cone clutch 83 will be out of frictional engagement with both of the cone sleeves and, as a result, there will be no driving connection between the engine shaft and the propeller shaft, and the propeller will idle. It will be appreciated, however, that when the propeller is working the pressure of water against the same holds the clutch members in engagement and thereby relieves the strain on the cross or thrust pin.

The tilting mechanism

Occasions may arise, in connection with the installation of the outboard motor on the stern of certain type of boats, where it is desirable that the complete outboard motor be tilted or adjusted at a proper angle relative to the stern of the boat so as to obtain the greatest efficiency of operation, which is accomplished when the outboard motor is perpendicular to the water line. For example, as is well known, the stern of some boats have a pronounced overhang, while others have a perpendicular stern. With the perpendicular stern it is a simple matter to clamp or mount the outboard motor at the stern in the proper perpendicular position relative to the water line, but when the stern has a pronounced overhang it is necessary to mount or tilt the motor at an angle relative to the stern of the boat so that it will present the proper perpendicular position to the water line. Therefore, in the mounting of our outboard motor, to accomplish this necessary adjustment when required, we have devised the following arrangement.

Referring to Fig. 13 the letter M indicates as an entirety a clamp bracket by means of which the entire outboard motor is mounted on and hung from the stern. This clamping bracket comprises a back plate 102 of any suitable dimensions which is adapted to rest flat against the stern or transom of the boat. This back plate has preferably cast integral therewith two side plates 103 terminating at their upper ends in hook-like clamping arms 104 which fit over the top edge of the transom or stern of the boat and at their free ends carry the clamping screws 105 of any suitable character. The lower end of the side plates 103 terminate in the horns 106, the under edges of which are notched or toothed as at 107, these horns having a series of spaced holes 108 therein for the purpose hereinafter mentioned. The hanger bar or shaft 109 is mounted in the upper ends of the side plates 103.

Hung from this bar 109 and free to swing or rock thereon is a tilting bracket T shown in detail in Fig. 14 and also in section in Fig. 5. This tilting bracket T is in the nature of a casting, the top of which is in the form of a split collar 110, the lugs 111 of which are bored for the reception of a clamping bolt 112 by means of which the collar end of the bracket is clamped about the neck of the casing D. The rearwardly extending lugs 113 of this tilting bracket T are bored as at 114 for the passage of the bar or shaft 109 upon which the bracket T is hung, these lugs lying just inside of the boat clamping arms 104. The standard or leg 115 of the bracket T terminates at its lower end in a bored foot block 116, the latter being made in two pieces to form a bored thrust bearing for the casing D which passes therethrough. Now, as the casing D is free at its upper portion to turn in the collar 110 when swung by the tiller, and of course to have its tubular section 67 turned in the bore of the foot block, it will be noted that when the tiller is swung from side to side the entire outboard motor, including the engine, the propeller and the intermediate casing D and the parts housed therein may be turned or swung in this bracket T. Furthermore, if it be desired to adjust or tilt the outboard motor at an angle relative to the clamp bracket M, by means of which the whole structure is mounted on the rear of the boat, this may be accomplished as follows. The operator grasping the top or hood of the engine may, for example, swing or tilt the entire motor and its connected parts, outboard or inboard, because while the bracket M is rigid or stationarily clamped to the stern of the boat, the tilting bracket T is free to rock or swing on the hanger bar 109 carried by this bracket M. Then, when the motor has been so tilted or swung to the desired position, the operator places the removable thrust pin 117 in the proper pair of aligning holes 108 of the horn 106, and between which parallel horns the casing D is positioned, as will be understood by reference to Fig. 2. Thereupon, when the operator releases his hold upon the hood of the engine for example, the weight of the mechanism, as well as the thrust of the propeller, when the boat is in motion, will hold such mechanism up against this thrust or cross pin 117. It will be noted that that portion of the foot block which rests against the thrust or cross pin 117 is recessed as at 118 for the seating of this thrust pin.

Now it may happen that when the boat is proceeding forward under power, the propeller or its casing may encounter an obstruction, such as a snag or the like, under the water. Under such conditions it is desired to have the outboard motor rock or tilt upward to clear the obstruction, or at least to prevent the breakage or damage to parts, which would be liable to occur were the propeller and the motor rigidly held against tilting. Therefore, we have provided an arrangement by which the bottom end of the propelling mechanism, which is normally held in proper position against the thrust or cross pin 117, both by its own weight and by the pressure of the water as the propeller is operating, may be permitted to tilt if an obstruction be encountered, and furthermore, may be locked against tilting when reversing. This is accomplished as follows. The stem 95 of the reversing and idling mechanism passes through the foot block as shown in Figs. 1 and 5. As will be seen by reference to Fig. 15, this foot block houses an angle locking plate 119 which is centrally curved or bowed as at 120 to fit snugly against the adjacent curved wall of the tubular section 67 of the casing D. The straight ends or wings 121 of this angle locking block 119, extend through elongated rectangular slots 122 in the sides of the foot block, and such ends or wings 121 projecting beyond the sides of the foot block are adapted to receive or fit into the notches or teeth 107 of the horns 106, when the propeller is reversing or idling, so that the tilting of the motor will be prevented. When, however, the propeller is driving the boat forward, this angle locking plate 119 will be in a depressed or lowered position out of contact with the teeth or notches of the horn, as shown in Fig. 1, and consequently, should the propeller mechanism strike an obstruction, the whole motor will be free to tilt, because this locking plate is in an inactive position. This is due to the fact that when the propeller control mechanism, including the cone clutch devices, are in the position they occupy when the propeller is driving the boat forward, the stem 95, through the pinion gearing, will have been moved vertically downward a short distance.

Now, as will be seen by reference to Fig. 1, this stem 95 carries fast therewith a collar 123 and loose therewith a collar 124 upon which the locking plate 119 rests, and between said collars is a coil spring 125. On the downward movement of the stem 95 the loose collar with the spring will also be moved downward away from supporting position with respect to the locking plate 119 so that the latter may drop of its own weight to the bottom of the slots in the foot block. When, however, the stem 95 is moved upward to first bring the propeller mechanism to idling position, before reversing, the spring tension collar 124 will, in its upward movement, lift the locking plate 119 into engagement with the notches or teeth 107 of the horns 106, and thereby hold the propeller mechanism against tilting while in idling position, and the coil spring will then permit of the still further upward movement of the stem 95 after the locking plate 119 has engaged its notches, thereby permitting the propeller to be put into reversing position. It will therefore, be seen that the engine may tilt when the boat is being driven forward, because the locking plate 119 is out of locking engagement with the horns, but that when the propeller is either in its idling or reversing position, the locking plate will engage with the horns and hold the propeller mechanism against tilting. It will be noted that the foot block is provided with segmental slots 126 and 127 to permit the swinging and oscillating of the casing D and its enclosed parts with respect to the tilting bracket T.

The top section of the propeller casing is constructed with a somewhat irregular centrally and longitudinally extending angular diaphragm 128 which, in conjunction with the side and top walls of this upper portion of the casing, forms a lubricating oil chamber 129 for the reception of the oil indicated at O, this oil chamber 129 communicating with the interior of the casing D which forms in effect a continuation of the oil reservoir. The oil line or surface is indicated in Fig. 1 at the point o. The circulation of the oil is accomplished through an oil pump U of any suitable and approved construction which is driven from an eccentric 130, mounted upon the cone sleeve section 80, the oil being forced by the pump up through the internal pipe 35 and circulated, as hereinbefore described, the oil after performing its lubricating purposes returning to the reservoir, as has been mentioned. It will be noted that the oil reservoir or chamber 129, with the oil pump, the lower portion of the chamber D, which contains some of the oil, and a part of the oil pipe 35, are all located below the water line, as will be seen by reference to Fig. 1, and therefore the oil is maintained efficiently and properly cooled by the water.

To provide for the circulation of water to the water jacket of the engine, we provide a suitable pump V similar to the oil pump U which is also driven by an eccentric 131 mounted on the section 79 of the cone sleeve. This pump takes water which is drawn in through the openings 132 leading to the water chamber 133 in the upper section of the propeller casing, below the diaphragm 128, and forces such water through pipe 134 and through pipe 135 to the water jacket 136 of the engine. From the water jacket the water passes through a discharge pipe 137 into the exhaust. This exhaust of course also leads off the spent gases from the engine in the usual manner. Of course, when the propeller shaft is idling the pumps will continue to work because the cone sleeves will be rotated through the drive shaft s and the associated gearing.

The gas tank for the fuel, shown at Y, may be located in any suitable manner with respect to the engine, but for convenience, as shown in Fig. 1, is shown as surrounding the engine proper, the fuel passing through a suitable passage from the reservoir tank Y to the carburetor. If desired, a water-tight hood H may be provided to encase all of the electrical and associated equipment at the upper part of the engine.

While we have herein shown and described the preferred embodiment of our invention we wish it to be understood that we do not limit ourselves to all the precise details of construction herein set forth by way of illustration, as modification and variation may be made without departing from the spirit of the invention or exceeding the scope of the appended claims.

What we claim is:

1. In a power unit of the class described, a hydrocarbon motor having a water jacket and a plate housing, a shaft housing extending outwardly from the motor and interiorly provided with non-communicating water and lubricant holding wells, a shaft operated by the motor and disposed within the housing and separate supply systems connecting the water jacket and the plate housing with said wells and including pumps operable by the shaft to pump water and lubricant from the respective wells into the water jacket and plate housing respectively.

2. In a power unit of the class described, a two-cycle reciprocating hydrocarbon motor including a plate housing, a drive shaft extending through the plate housing, a series of successively disposed cylinders superimposed on the plate housing and having pistons connected with the drive shaft, an intake manifold common to all of said cylinders, alternate cylinders of said series being connected by fuel passages extending from the intake and non-communicating with the area of the crank case surrounding the drive shaft.

3. In a power unit of the class described, a two-cycle reciprocating hydrocarbon motor including a plate housing, a drive shaft extending through the plate housing, a series of successively disposed cylinders superimposed on the plate housing and having pistons connected with the drive shaft, an intake manifold common to all of said cylinders, alternate cylinders of said series being connected by fuel passages extending from the intake and non-communicating with the area of the plate housing surrounding the drive shaft, a shaft housing connected to the crank case and having a lubricant holding reservoir, surrounding the drive shaft, and a force feed lubricating system arranged for delivering lubricant from the reservoir to the area of plate housing surrounding the drive shaft and including a pump operated by the drive shaft and an outlet pipe extending from the pump to the connections between the drive shaft and the pistons.

Signed at New York city, in the county of New York and State of New York this 11th day of June, A. D. 1928.

WALTER B. HARRIS.
LEONARD B. HARRIS.